Patented Jan. 23, 1951

2,538,863

UNITED STATES PATENT OFFICE 2,538,863

REFRIGERANT AND METHOD

Graham W. Dible, Los Angeles, Calif.

No Drawing. Application February 28, 1948,
Serial No. 12,159

2 Claims. (Cl. 47—58)

My invention relates to a novel refrigerant and method of making and using same. More particularly it relates to a refrigeration unit or to a block of refrigerant which can be used in various ways to refrigerate a space.

It is often desirable to be able to refrigerate various items during long-distance shipping. Use of conventional ice in this connection is often disadvantageous because of weight considerations or because of dripping as the ice melts. Refrigeration with solid carbon dioxide, commonly known as "dry ice," is successful in certain instances, particularly as weight considerations are bettered, but this medium is disadvantageous in various other respects such as its tendency to produce very low temperatures, "melt" rapidly and maintain a relatively dry atmosphere albeit moist, cool atmospheres are desirable in shipping certain products.

By way of example, long-distance shipping of flowers is desirably accomplished in relatively long and small cartons, the atmosphere being maintained moist and the degree of refrigeration being limited to avoid any danger of freezing the flowers. Use of ordinary ice in this connection makes shipping by air extremely costly. In addition, the water produced during melting of the ice is troublesome and the rate of melting is usually relatively rapid. Dry Ice has been used with some degree of success for aerial shipments of flowers but must be carefully handled and packed to retard its "melting." In addition, the evolution of gaseous carbon dioxide is sometimes disadvantageous and dangerous in sealed containers.

It is an object of the present invention to provide a refrigeration unit capable of refrigerating a space by the progressive melting of a liquid contained therein. In the present specification and claims the term "refrigeration unit" is used synonymously with "refrigerating block" or "refrigeration mass" irrespective of the size or shape of the block or mass.

It is an important object of the present invention to provide a refrigeration unit which will not leak liquid; which is readily adaptable to use in different-sized packages; which is of extremely light weight; which produces a moist, cool atmosphere; and in which the primary medium can be repeatedly reused, if desired.

In this connection, it is an important object of the invention to provide, as an article of manufacture, a refrigeration unit comprising a block of cellular medium providing cells at least some of which are substantially filled with a frozen liquid.

Another object of the invention is to provide a refrigeration unit comprising a block of highly-cellular compressible medium providing cells fillable with a liquid upon compression and expansion of the block while submerged in a liquid, the liquid in the cells being in frozen state at the time the refrigeration unit is used.

Another object is to provide a refrigeration unit comprising a multitude of frozen droplets of liquid, each joined to at least one adjacent droplet by at least one neck of the frozen liquid but otherwise separated from adjacent droplets by webs of a suitable medium. A further object is to provide a refrigeration unit comprising a multitude of frozen droplets of liquid spaced by porous or interstitial webs.

Another object of the invention is to provide a novel method of forming such a refrigeration unit and a novel method of using same to cool a space. Another object is to provide a novel method of refrigerating flowers or other perishable produce during long-distance shipment.

Further objects and advantages of the invention will be evident to those skilled in the art from the following description of exemplary embodiments:

I have found that a refrigeration unit of great commercial utility can be produced by at least partially filling the cells of a cellular or sponge-like medium with a liquid and then freezing the liquid in situ. In such a cellular medium the pores or cells communicate with each other in a manner to facilitate complete or partial filling with a liquid. When frozen, the refrigeration unit comprises, in effect, a multitude of small frozen droplets of liquid, each joined to at least one adjacent droplet by one or more necks of the frozen liquid but otherwise separated from adjacent frozen droplets by webs of the medium of which the block is formed.

With such a refrigeration unit, melting of the droplets is slowed by the fact that heat, drawn from the space to be refrigerated, can reach a particular droplet only by conduction thereto through liquid-filled cells near the outside of the block and through the webs of the medium of which the block is made. Correspondingly, the rate of melting is substantially retarded and the effective life of the refrigerant is substantially prolonged.

The cellular medium may be any sponge-like medium, such as a natural or synthetically-formed sponge, sponge rubber, foam rubber, etc., but it is distinctly preferable to employ a material known as foam resin, a lightweight, highly-cellular material widely used as a filler in buoyant structures. This medium is relatively more resistant to deformation than is sponge rubber or foam rubber and has a texture similar to a finely-textured cake, e. g., angel food cake. This product is commercially available under the trademark "Snowpack," a product currently manufactured by the Mishawaka Rubber Company of Mishawaka, Indiana. The density of this medium is very low, a block measuring about 3¾ x 4⅝ x 10" weighing slightly more than one ounce. A block of this material is partially or completely saturated with liquid in a manner to be hereinafter described.

As to the liquid employed, plain water, such as is employed for drinking and domestic purposes, is usually satisfactory. However, if lower refrigerating temperatures are desired, the cellular medium can be partially or completely filled with brine or other liquid having a lower freezing point than plain water. In addition, various other liquids can be employed, adapted to the particular conditions desired in the space to be refrigerated. For example, various chemicals can be added to the water taken up by the cellular medium to be present or released in the space to be refrigerated. For example, in shipping flowers, a small amount of plant-growing compound or chemical can be incorporated in the liquid to control the degree of opening of the flowers during transit. Other media retarding the opening of the flowers can also be mixed with the water. In fact, any water soluble conditioning material can be incorporated in the water to condition the atmosphere in the space to be refrigerated. In certain instances, it is desirable to dissolve scenting media in the water to impart a desirable scent to the product being shipped or to the atmosphere of the container when first opened.

If the cellular medium, such as foam resin, is obtained in blocks of larger size than desired for the particular container, the cellular medium can be cut to size before or after being impregnated with water. Foam resin can be readily sliced with a knife and it is particularly advantageous to incorporate the liquid into blocks thereof of larger size than will be used in the usual floral container, the material being thereafter sliced to produce the liquid-containing block of desired size. During this slicing, this material will exude very little if any liquid.

With many cellular media, the liquid can be incorporated merely by submerging the block in a body of the liquid and squeezing it by hand or by mechanical means to expel air from the cells, after which the squeezing force is withdrawn to permit the water to fill, at least partially, the cells. The degree of filling is preferably such that little if any liquid will drop from the cellular medium after the block has been subjected to freezing temperatures and during use as a refrigerant.

The preferred medium of incorporating liquid into a block of foam resin is to float the block on a body of the liquid for several minutes, typically two or three minutes, then place it in an open-top container little larger than the block and containing some of the liquid, the block being compressed in the container by pressing downwardly on a plate fitting within the container and contacting the upper surface of the block. The plate can be forced downwardly by any suitable lever mechanism. It is preferable to compress and expand the block twice in such a container, once while the plate is in contact with the top surface of the block and once when the block has been inverted in the container. With a block of the approximate size noted above, satisfactory results will be obtained by compressing it to about one-half its normal volume and, upon release of the compressing force, it will be found that such a block will take up about one pint of liquid and will weigh about ¾ lb. to 1 lb. However, more or less liquid can be incorporated into the block without departing from the spirit of the invention.

Irrespective of the cellular medium employed and the manner of incorporating the liquid therein, the liquid-containing medium is then subjected to freezing temperatures for a sufficient period of time to freeze substantially all of the liquid droplets in the cells of the medium. The block is then in condiiton for use as a refrigeration unit, in accordance with the invention.

If the refrigeration units are made in large blocks they will be found very satisfactory for use in refrigerating freight cars, being disposed in the usual ice compartments. If desired, a stream of air can be circulated over the refrigeration unit and into the car or other space to be cooled. Alternatively, the refrigeration unit can be used to establish a circulation of air through the space to be cooled. In any of these instances, the heat from the space will be applied to the surface of the block or cellular material and will be conducted relatively slowly to the interior thereof and to any unmelted liquid droplets therein.

In the refrigeration of containers for cut flowers, the invention can be used in various ways. For example, the box or container can be lined with wax paper or foil and the refrigeration unit, in the shape of a block or slab, placed in the bottom of the box or held in some portion of the lower end of the box by suitable cleats formed of wood or cardboard, typically cardboard webs. Such a block or slab can be incased in flexible, transparent material impervious to moisture, if desired, typically any of the commercially available plastic materials such as cellophane or Pliofilm. Alternatively, and if a moisturized atmosphere is desired, all or a portion of the block or slab may be left exposed to the air in the container. The flowers can be placed on top of the block or slab, preferably separated therefrom by a layer of paper or the aforesaid plastic material. If desired, the flowers may be placed in a bag of the above-mentioned flexible, transparent medium, the bag being placed on top of the refrigerated block or slab. Alternatively, the refrigeration unit may be disposed at one end or one side of the flower-containing box.

Another excellent way of shipping cut flowers is to embed their stems in a block of foam resin which has been previously saturated, at least in part, with water in the manner outlined above, and which will act as a support for the flowers. The flowers can be laid into a box, lined with wax paper or foil, with the supporting block near one end of the box but spaced therefrom. In this space is disposed one of the refrigeration units of the invention, typically a water-containing frozen block of foam resin. The two blocks can be in contact with each other or separated and both blocks are preferably held in place by any suitable means such as cleats or straps. In the absence of substantial compressive forces, such blocks will not exude liquid even when the droplets therein are partially or completely thawed, the sponge-like nature of the cellular medium holding the liquid in place.

A valuable feature of the invention is that the liquid-containing block can be repeatedly reused. Once such a block has partially or completely thawed, its liquid can be refrozen, with or without adding more liquid thereto, and the frozen block can again be used as a refrigerating unit.

Various changes and modifications can be made without departing from the spirit of the invention as defined in the appended claims.

I claim as my invention:

1. As an article of manufacture, a refrigeration unit comprising a cellular block of foam resin having at least some of its cells substantially filled with a frozen liquid including a highly volatile constituent, said frozen liquid in the cells inside said block being meltable only by heat transmitted thereto through the resin and through liquid-filled cells nearer the outside of said block to retard melting of said frozen liquid.

2. A method of shipping flowers, which method includes the steps of: at least partially saturating a cellular medium with a liquid containing a scenting medium compatible with the scent of said flowers; freezing the liquid in said cellular medium; and placing said cellular medium with its frozen liquid in a confined space with said flowers to cool and scent the atmosphere in said space.

GRAHAM W. DIBLE.

REFERENCES CITED

The following references are of record in the file of this patent:

UNITED STATES PATENTS

| Number | Name | Date |
|---|---|---|
| 1,754,594 | Bens | Apr. 15, 1930 |
| 2,178,675 | Thomas | Nov. 7, 1939 |
| 2,208,855 | Riley | July 23, 1940 |
| 2,210,946 | Moore | Aug. 13, 1940 |

FOREIGN PATENTS

| Number | Country | Date |
|---|---|---|
| 338,443 | France | Dec. 2, 1903 |